United States Patent [19]

Raisch et al.

[11] 4,247,565

[45] Jan. 27, 1981

[54] DRAWABLE SULPHUR RESISTANT CAN COATING

[75] Inventors: Henry W. Raisch, Crystal Lake; Kenneth E. Carlson, Des Plaines, both of Ill.

[73] Assignee: American Can Company, Greenwich, Conn.

[21] Appl. No.: 48,882

[22] Filed: Jun. 15, 1979

[51] Int. Cl.[3] ........................ B65D 25/14; B05D 1/38; B05D 1/40; B32B 15/08

[52] U.S. Cl. ............................... 426/126; 113/120 A; 113/120 H; 220/453; 220/456; 426/118; 426/131; 426/398; 427/380; 427/383.7; 428/551

[58] Field of Search ............... 426/126, 118, 131, 398; 427/380, 383 C, 383.7; 428/551; 220/453, 456; 113/120 A, 120 H

[56] References Cited

U.S. PATENT DOCUMENTS 3,206,848 9/1965 Rentmeester ............... 113/120 A X

*Primary Examiner*—James R. Hoffman
*Attorney, Agent, or Firm*—Robert P. Auber; Ira S. Dorman; Stuart S. Bowie

[57] ABSTRACT

Disclosed is a coating system for use in connection with a ferrous plate to be drawn into containers for packing sulphur bearing foods. More particularly, the coating system is capable of being drawn and includes aluminum and zinc oxide for purposes of uniform interior appearance and sacrificial protection respectively.

10 Claims, No Drawings

DRAWABLE SULPHUR RESISTANT CAN COATING

BACKGROUND OF THE INVENTION

The background of this invention relates to packing sulphur bearing foods such as shrimp, albacore tuna, regular tuna, crab pieces, shredded crab, salmon and shredded chicken. In particular, these products are light in color and need protection from discoloration and contamination which results when the sulphur in them forms sulfides with the ferrous and stannous metal of the container. Since such food products have been packed in containers for many years, it was well known to use zinc oxide containing enamel for coating the plate from which 3-piece cans were formed. This worked well for a number of years because 3-piece cans were fashioned from flat blanks of sheet stock that were rolled into a cylindrical form and along a longitudinal side were sealed by soldering, by bonding, by cementing or by welding. Such flat strips could be heavily precoated and the finished cylinder needed a side seam stripe in order to protect the inside. The formed cylinder had two open ends and to complete the can a bottom and top were added and these were also heavily precoated. It was also known to add aluminum pigmentation to the coating to improve the inside appearance of the container. Such pigmentation was used to mask underfilm staining, and unevenness in the inside appearance by forming a uniform overall coloring. The aluminum pigment is also beneficial in connection with underfilm sulfide staining which is chemical reaction, that cannot be completely prevented, occurring by the migration of sulfides and mercaptans through the film. The aluminum pigmentation permits a certain amount of staining without a visible change in the overall uniform interior coloration. It was also known to use zinc oxide in the coating since sulfides react with zinc oxide forming light colored zinc sulfides rather than forming the black ferrous sulfide on the can or in the product.

The formulation of a coating system which has the advantages of aluminum pigmentation and zinc oxide and is able to be drawn or multiply drawn for purposes of forming a 2-piece container was beset with a number of difficulties. More particularly, coatings which draw such as vinyl organosols can be applied to a flat plate intended to be drawn and redrawn, but such coating material does not readily hold zinc oxide powder in suspension as it causes rapid gellation of the coating. Ordinarily, zinc oxide containing enamels which were acceptable in connection with the coating of 3-piece cans are incapable of accepting the stretching and bending during drawing. They tend to flake off and to lose adhesion during drawing or subsequent processing of foods. It became apparent that a proper coating system containing the aluminum pigment and the zinc oxide that would be able to be drawn and redrawn was needed.

Therefore, an object of the present invention is to provide a coating system which can be used to contain light colored sulphur containing foods, in order to protect them from the discoloration by the drawn containers having ferrous and stannous metals.

It is another object of the invention to provide a coating system which will adhere to the metal substrate during drawing, redrawing and subsequent processing.

It is still a further object of the invention to provide a coating system for drawing a container which will mask underfilm staining; and provide low metal exposure on drawn cans, and thereby minimize black sulfide buildup at coating discontinuities.

Yet a further object of the invention is to provide a coating system which will contain zinc oxide in a manner which permits it to act sacrificially to prevent formation of dark colored metal sulfides and hydrogen sulfide gas when a ferrous drawn container is packed with sulphur bearing foods. The foregoing objects are obtained with the coating system disclosed in the Summary of the Invention which follows.

SUMMARY OF THE INVENTION

This coating system combines a number of ingredients each of which has a special role in providing the beneficial effects on seafood packed in cans. The present coating system relates to a combination of a base coat and a top coat which when applied to TFS-CT (tin free steel chrometype) or ETP (electrolytic tinplate) permits the formability necessary for making a drawn container. A base coat is provided which acts as a primer and helps to enhance the adhesion of the top coat to the ferrous or stannous metal substrate. The particular base coat contains aluminum pigment carried in an epoxy phenolic resinous vehicle. The top coat is designed for its overall drawability and contains zinc oxide carried in an unsaturated polyester structure which oxidizes and cross links during curing to form a cured polyester coating or a polyhydrocarbon which polymerizes via unsaturated olefin bonds. The aluminum pigment is added to the base coating to hide staining on the plate by providing a metallic layer of uniform coloration. The zinc oxide acts sacrificially and minimizes the formation of black iron sulfide particles due to the reaction of the sulphur in the food product. Similarly, the zinc oxide minimizes purple sulfide spangling due to the reaction with the surface tin of containers made with tinplate. The oleo resinous portion of the top coat provides additional coverage and freedom from flavor problems. The coating system which is a combination of the base coat for adhesion and coloration protection and the top coat for carrying the sacrificial zinc oxide is excellent for use in protecting plate to be drawn or multiply drawn to provide a container for packed and processed sulphur containing foods. The contents are protected by zinc oxide neutralizing odorous sulphur compounds in the volatile head space gases.

DETAILED DESCRIPTION OF THE INVENTION

In the preferred embodiment, the base coating is an epoxy phenolic material such as MC3846-901 by Mobil Chemical Co. of Pittsburgh, Pennsylvania. This includes aluminum pigmentation of approximately 10% of the total weight of resin solids. Such material is used generally as a can interior coating for packing comestibles, but not sulphur containing foods.

It has been found that such epoxy phenolic materials, applied to the inside of the can by means of roller coating, adhere well to the plate surface during subsequent plate forming operations such as drawing. Once roller coated, the material is cured by baking at 400° F. for 6–12 minutes in a hot air convection oven and then allowed to cool.

The plate with base coat is then again roller coated with an oleo resinous top coat containing zinc oxide. A material which works satisfactorily and is supplied by Cook Paint and Varnish Company of Kansas City, Missouri and consists of an oleo resinous portion 202 C 377 and a zinc oxide paste 202W 300G; the resin is basically an unsaturated polyester structure that oxidizes and crosslinks upon curing. For curing, the plate which has been roller coated is put in a hot air convection oven at 415° F. for 6 to 10 minutes. A similar oleo resinous top coat which performs successfully, is a polyolefin material which can be obtained through Mobil Chemical Co. of Pittsburgh, Pennsylvania under their coating numbers MC5698-004 and MC1949-101 (zinc oxide paste). That material is also cured in an air oven at 415° F. for 6 to 10 minutes and during curing it polymerizes. The aforementioned top coatings each contain zinc oxide in the form of a paste. The paste is a mixture of zinc oxide powder carried in the particular vehicle used for the top coat. Consequently, 15%-30% of the solids in the top coat are zinc oxide powders.

Very thin coatings are used in can making, but to provide a thick enough coating which will adequately cover the plate, sufficient material must be applied during roller coating. The industry standard for coating thickness is a number of milligrams per four square inches. The base coat is applied at the rate of 17 mg per 4 square inches to the metal substrate of TFS-CT or electrolytic tinplate. For the top coat the roller coating is applied at a rate of 22 mg per 4 square inches over the base coat. The coated panels are the lubricated to facilitate drawing and redrawing with an FDA approved lubricant for use in preparing containers for packing comestibles.

It has been found that the base coat acts as a primer to provide good adherence to the metal substrate and to establish a surface which accepts the top coating and holds it securely such that both films remain intact and integral with the metal plate during the drawing of the plate to form a container. The coating system of the combination described provides a barrier which minimizes the amount of metal exposed to an extent sufficient to permit sulphur bearing food products which are light in color to be packed and processed without subsequent staining from sulfide formations. The zinc sulfide which is sacrificially formed is light in color and acts to maintain the preferred color of the food.

While specific coating materials have been described and explained, the invention in its broadest aspects includes any coating system which uses an epoxy phenolic base coating carrying an aluminum pigment and an oleo resinous top coating having zinc oxide. It is, therefore, desired that the claims which follow will be construed to cover the invention in its broadest context.

What is claimed:

1. A coating system for the inside of a drawn container for carrying sulphur bearing foods including a blank to be drawn into a container having applied thereover an epoxy phenolic primer base coat containing aluminum pigmentation being a relatively small fraction by weight of resinous solids therein and a top coating applied thereover being an oleo resinous material having zinc oxide powder being a relatively small fraction by weight of solids therein.

2. The coating system of claim 1 wherein the aluminum pigmentation is 10% by weight of the resinous solids.

3. The coating system of claim 1 wherein the zinc oxide powder is in the range of 15 to 30% by weight of the solids in the oleo resinous material.

4. The coating system of claim 1 wherein the oleo resinous material is a heat polmerized olefinic structure.

5. The coating system of claim 1 wherein the oleo resinous material is a heat cured oxidized and crosslinked polyester structure.

6. A method of coating a metal plate to be drawn including the following steps:

(a) applying by roller coating an epoxy phenolic primer base coat carrying aluminum pigmentation of about 10% of the weight of solids therein to a ferrous substrate;

(b) curing said epoxy phenolic coating at about 400° F. for 6 to 10 minutes in a hot air convection oven;

(c) applying by roller coating a top coating of oleo resinous material carrying 15 to 30% by weight of solids therein of zinc oxide powders, and (d) curing said oleo resinous top coating in an air convection oven for 6 to 10 minutes at about 415° F.

7. A drawable sulfur resistant coating system on the inside of a drawn container fabricated for packing processable sulphur bearing comestibles including an epoxy phenolic primer base coat applied by roller coating at a rate of 17 mg per 4 square inches and having aluminum pigmentation of about 10% by weight of the solids therein, said base coating being cured by heat in a hot air convection oven for 6-10 minutes at 400° F. and a top coating which is applied by roller coating at a rate of 22 mg per 4 square inches thereover and being an oleo resinous vehicle with zinc oxide powder being about 15-30% by weight of solids therein and cured at 415° F. in an air convection oven for 6-10 minutes.

8. The coating system of claim 7 wherein said oleo resinous vehicle is a heat polymerized olefin structure.

9. The coating system of claim 7 wherein said oleo resinous vehicle is a heat oxidized and crosslinked polyester structure.

10. The coating system of claim 7 wherein said container has sulphur bearing comestibles and the zinc oxide in the coating neutralizes odorous sulphur compounds in the volatile head space gases.

* * * * *